United States Patent Office 3,357,980
Patented Dec. 12, 1967

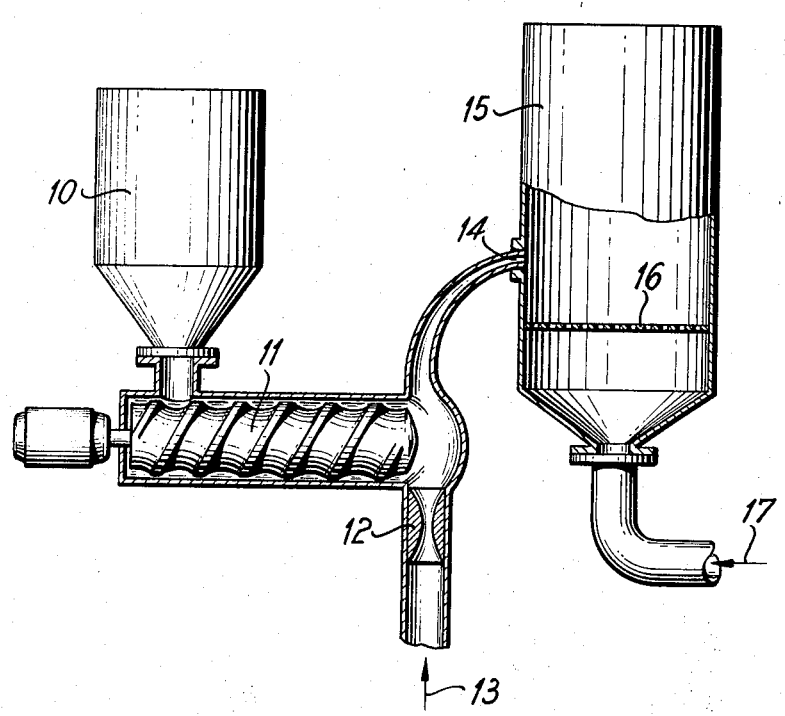

3,357,980
PREPARATION OF MELAMINE
Franz Kaess, Traunstein, Horst Prietzel, Trostberg, and Kurt Scheinost, Tacherting, Germany, assignors to Suddeutsche Kalkstickstoff-Werk Aktiengesellschaft, Trostberg, Germany
Filed Nov. 12, 1965, Ser. No. 507,373
Claims priority, application Germany, Nov. 16, 1964, S 94,202
8 Claims. (Cl. 260—249.7)

This invention relates to a method for the preparation of melamine.

Heretofore, only such methods for the preparation of melamine from dicyanodiamide have assumed commercial importance which required elevated pressures; generally they were carried out as a batch process. In order to avoid the considerable expenditures of a high pressure plant, attempts have been made to convert dicyanodiamide to melamine at atmospheric pressure in a turbulence reactor. Various porous active adsorbents have been used as catalysts maintained in turbulent motion by ammonia gas. At reaction temperatures of 180–250° C., the yields obtained in said process have been in the range of 85–92 percent, the purity of the melamine produced being 90–95%. These two results combined, i.e., only moderate yield and low purity, render the known low pressure methods, as described, e.g., in DAS Nos. 1,117,592 and 1,167,350, also in Rev. Chem. (Bucharest), 9, 509–510 (1958), in no way superior to the high pressure methods where yields of more than 99% with a purity of the melamine up to 99% have been attained.

It is, therefore, a principal object of the invention to provide an improved low pressure method for the conversion of dicyanodiamide to melamine which produces yields and purities similar to those obtained with the high pressure procedures.

Other objects and advantages will become apparent from a consideration of the specification and claims.

We have found that the low quality of melamine produced at atmospheric pressure in a turbulence reactor is essentially due to the presence of desamination products of the melamine, especially melem. Said melem is either carried off by the turbulence gas, and is precipitated together with the melamine, or in the presence of ammonia it is at least partially decomposed on the catalyst itself to melamine and cyanamide. As the trimerization of cyanamide to melamine is a relatively slow reaction, the end product will still contain cyanamide or dicyanodiamide.

We have further found that the formulation of melem can be substantially suppressed by providing conditions where the melamine formed on the catalyst is sublimed off before fresh dicyanodiamide can be deposited on said melamine. Such favorable conditions are present when dicyanodiamide is used which has a smaller particle size than the catalyst and when such small particles of dicyanodiamide are introduced laterally into the turbulence zone at high speeds by means of a current of ammonia so as to be finely and homogeneously dispersed. The sublimed melamine is then precipitated at a temperature above 150° C. but preferably below about 230° C.

The catalyst granules must have at least three times the size of the dicyanodiamide particles; preferably, at least 50 percent of the dicyanodiamide particles should have at most 1/10 of the size of the catalyst. Very small catalyst particles, as used according to the previously recommended practice, appear not to be able to adsorb larger dicyanodiamide particles. As a result, the catalyst is not effective for part of the introduced dicyanodiamide, and said not converted dicyanodiamide is decomposed to desamination products. Therefore, the conventional finely divided catalyst having an average particle size below 0.15 mm. is unsuitable for low pressure melamine production on a commercial scale. Much better suited are catalyst particles having diameters of, e.g., 0.75 mm., which is a multiple of the diameter of the dicyanodiamide particles employed, they are able ot adsorb one or even several small dicyanodiamide particles without losing their resorptive power and remain effective for the formation of melamine. The diameters of the catalyst granules should not drop much below 0.75 mm. in order to ensure in the turbulence zone a sufficient linear rate of flow (about 1 m./sec. or more); such rate of flow allows of charging large amounts of dicyanodiamide into the reactors because said amount increases, due to the melamine sublimation, proportionally to the amount of ammonia which can be passed therethrough. In this way, the rates of flow can be increased ten times over the rates which have been possible heretofore. Further advantages resulting from our new method are a more homogeneous adsorption of the dicyanodiamide on the individual catalyst granules and therewith prevention of the formation of desamination products. In this way, melamine is obtained in yields averaging 98.5–99.0% with a purity of 99.9%. Finally, the use of coarser catalyst material reduces considerably the formation of dust and the space requirements and thereby improves the economy of the process.

In carrying out the invention, the coarse catalyst is kept in continuous turbulent motion by a current of gaseous ammonia, and very finely and homogeneously distributed dicyanodiamide is introduced by a current of ammonia into said fluidized catalyst. Due to the turbulent motion of the catalyst bed always fresh catalyst particles, which already have substantially given off the melamine formed in their pores to the ammonia gas, pass by the injection nozzle and are recharged with the freshly injected dispersion of dicyanodiamide in ammonia. The essential advantage obtained by the introduction of dicyanodiamide is fine homogeneous distribution by means of a gas current might be explained as follows: All other conventional ways of introducing the dicyanodiamide into the reaction zone may produce temporary agglomerations of dicyanodiamide partciles resulting in a temporary local excess of the dicyanodiamide which reacts instantaneously and overloads the just available catalyst granules; this is the cause of the formation of melem. If the dicyanodiamide is introduced as fine dispersion, no agglomerations or caking can take place.

The lateral injection of the dicyanodiamide into the fluidized bed is preferably carried out in a horizontal or slightly inclined direction. The feed conduit and injection nozzle for the dicyanodiamide are so dimensioned as to limit the $NH_3$ current flowing therethrough to less than 10 percent of the gas in the turbulence reactor and to increase the speed in the injection nozzle to at least five, preferably more than fifteen times, the gas velocity in the turbulence bed. If said branch $NH_3$ current is too small, then the velocity in the feed conduit becomes too low, and the dicyanodiamide is not sufficiently dispersed. As a result, the catalyst will become at least locally overloaded, even when the granules are sufficiently large, and melem will be formed, interfering with the yield and purity of the produced melamine. In commercial production, we have found that at least 210 kg. of ammonia gas are required to introduce 1 long ton of dicyanodiamide into the reactor.

The same effect as set forth above for too low gas velocities in the feed line will take place when the entry speed of the ammonia-dicyanodiamide current into the fluidized bed is too low; this takes place when the injection nozzle is too large. Then the dicyanodiamide is deposited only on a few catalyst granules, which again causes losses of the yield by the formation of desamination products.

Finally, also an excessive concentration of dicyanodiamide in the ammonia carrier current will overload the catalyst, which causes the loss of a considerable proportion of the dicyanodiamide by formation of melem.

The required amount of ammonia depends to a certain extent on the composition and surface properties of the catalyst. Various catalysts have been described in the literature and used; mostly, they are silica gel, alumina, or mixtures thereof. The following figures relate to a silica gel catalyst containing 10% of $Al_2O_3$ and having a specific surface of 400 m.$^3$/g.

4 to 6 kg. of catalyst are required for an hourly production of 1 kg. of melamine from 1.02 kg. of dicyanodiamide. Regarding catalytic efficiency, adsorptive power, and stability, the catalyst has an almost infinite life when ammonia and dicyanodiamide are introduced into the fluidized bed in the ratio of 10:1 by weight.

In the production of melamine in fluidized bed reactors of large diameter in accordance with our new process, the required heat is not longer supplied through the walls of the reactor but preferably by the ammonia used as turbulence gas. As the heat of reaction and the heat of sublimation almost balance each other, the wall of the reactor need be heated only to such an extent that heat losses are compensated. In this way, the temperature distribution in the catalysts bed is completely homogeneous, and at every point of the bed the conversion of the dicyanodiamide and the sublimation of the formed melamine proceed at the same rate, without the formation of any substantial amount of desamination products.

The temperature of the ammonia current used for the dispersion of the dicyanodiamide may be from room temperature up to about 150° C. but must be kept at all means below the melting point of the dicyanodiamide. It is of advantage to preheat the ammonia gas used for producing the turbulence to the temperature of the fluidized bed so as to make any other heat supply unnecessary. The reaction temperature in the fluidized bed is preferably in the range of 320–360° C. Said range constitutes an optimum for reaction and sublimation rate. At temperatures below said range, the rate of reaction and sublimation is very slow so that for a commercial production either the input of dicyanodiamide becomes too low or the amount of ammonia required for the turbulence zone assumes too high values. At temperatures above 360° C., the quality of the produced melamine deteriorates very quickly by admixture of cyanamide, dicyanodiamide, and difficulty soluble higher condensed desamination products.

It is of advantage to precipitate the sublimed melamine in the temperatures range of 150 to 230° C.

The process can be carried out also at slightly elevated pressures up to about 20 atm. Of course, the pressure must be increased only so far as to leave the ammonia in the entire system in the gaseous state.

The turbulence reactor used for the new process is provided with an injection nozzle so dimensioned that the ratio of nozzle diameter to fluidized bed diameter is 1:10–100. The nozzle is disposed in the lateral wall of the reactor in the range of the lower half of the catalyst layer and insulated or equipped with cooling means. Several such nozzles may be provided in suitable distribution over the periphery of the reactor.

In the accompanying drawing a device for carrying out the process according to the invention is shown diagrammatically. The device consists of a worm conveyer 11 which is driven at adjustable speeds and conveys a predetermined quantity of dicyanodiamide from the container 10 into the unheated ammonia current 13 flowing through the nozzle 12. The ammonia containing the dicyanodiamide is then injected laterally into the reactor 15 through the cooled nozzle 14. In the reactor, the catalyst is maintained over the bottom 16 as a fluidized bed means of hot ammonia 17. This device optimizes the distribution of the dicyanodiamide in the current 13 and produces a very homogeneous charge on the catalyst. As a result, the amount of catalyst required and the size of the reaction space can be reduced.

If dicyanodiamide is introduced into the fluidized bed directly by means of a screw conveyor, a vibrating grate or the like, it is impossible to obtain the yield and quality of melamine as obtained by our novel process. Said devices always introduce larger portions of dicyanodiamide into the fluidized bed so that the charge on the catalyst is never homogeneous and no pure end product can be obtained.

The following Examples 1–3 illustrates the invention in comparison to Examples 4–6 where the operative condition of the invention are not maintained.

Example 1

1.9 kg. of a catalyst, consisting of silica gel containing 10% of $Al_2O_3$ were placed into the turbulence reactor 15 of the 100 mm. inner diameter. The grain size of the catalyst was 0.5 to 0.75 mm., its temperature was maintained at 345±5° C. The catalyst was kept in turbulent motion by an ammonia current of 6 Nm.$^3$ per hour. About 500 liter/hour of said current were used to inject 460 g./hour of dicyanodiamide in finest distribution through water cooled nozzle 14 into the turbulence zone.

The dicyanodiamide had the following screen analysis:

| | Mm. |
|---|---|
| 0.1% | over 0.5 |
| 9.6% | over 0.3 |
| 17.3% | over 0.2 |
| 25.6% | over 0.15 |
| 33.4% | over 0.09 |
| 34.6% | over 0.075 |
| 34.9% | over 0.060 |
| 65.1% | below 0.060 |

After 9 hours of operation, a sublimate of 4.078 g. containing 99.9% melamine was recovered, corresponding to a yield of 98.5%.

After that time, the catalyst was still free flowing and without any lumps.

Example 2

In the apparatus as shown in the drawing, a tubulence reactor having an inner diameter of 500 mm. was charged with 85 kg. of a catalyst having the composition as described in Example 1 and a grain size of 0.75 to 1 mm. The catalyst was maintained at a temperature of 330 to 350° C. and maintained in turbulent motion by an ammonia current of 270 Nm.$^3$/hour. 23 Nm.$^3$/hour of said current was passed through nozzle 12 and picked up 20 kg./hour of dicyanodiamide of the grain size given in the table of Example 1. The velocity of the ammonia current 13 entering the reactor was 20 m./sec. In an uninterrupted operation of 68 hours, 1341.96 kg. of melamine were recovered with an average purity of 99.9%, corresponding to a yield of 98.6%.

After termination of the run, the catalyst was free-flowing, and no lump formation interferred with the fluidized bed.

Example 3

This example was similar to Example 1 and carried out in the same apparatus with the same catalyst and dicyanodiamide under the same temperature conditions as in Example 1, with the sole difference that elevated pressure was employed and the volume velocity of the ammonia had been adjusted to such elevated pressure to obtain the same rate of flow as in Example 1.

Air was removed from the reactor by repeated alternating introduction of ammonia under pressure and pressure releases. Finally, the fluidized bed was put into operation at a pressure of 16 atm. After the reaction temperature of 345° C. had been reached, 2760 g. of dicyanodiamide were injected with ammonia gas through nozzle 14; there were recovered 2730 g. of a sublimate with a content of 99.9% of melamine, corresponding to a yield of 98.8%.

Example 4

80 g. of the catalyst were brought to turbulent motion in a turbulence reactor of 45 mm. inner diameter by means of 260 liter/hour of ammonia. The catalyst had a grain size of 0.15 to 0.3 mm. As dicyanodiamide, we used a screened fraction of 0.2 to 0.3 mm., which was injected in an amount of 20 g./hour into the reaction space maintained at a temperature of 345° C. by means of ammonia. After 5 hours of operation, 92.5 g. of sublimate containing 96.2% of melamine were recovered, corresponding to a yield of 89%. The catalyst was partly agglomerated to larger lumps, due to the presence of desamination products.

Example 5

1.9 kg. of catalyst, grain size 0.5 to 0.75 mm., of the composition recited in Example 1 were kept by means of 6 Nm.$^3$ of ammonia in turbulent motion at a temperature of 400° C. in a reactor having 100 mm. diameter. Part of the ammonia was used to inject 440 g./hour of dicyanodiamide into the fluidized bed. After 6 hours, 2.531 g. of sublimate were recovered, having an average melamine content of 91.7% corresponding to a yield of 87.9%.

Example 6

48.5 g. of catalyst, composition as in the preceding examples, grain size 0.1 to 0.3 mm., were kept in turbulent motion by an ammonia current of 110 liter/hour. Part of said current was used to inject 8 g./hour of dicyanodiamide. The reaction temperature was 450° C. These were recovered as an average 6.5 g. of sublimate per hour, with a melamine content of 71.9%, corresponding to a yield of 58.2%. The balance was cyanamide, dicyanodiamide and difficultly soluble higher condensation products.

We claim:

1. A method of preparing melamine from dicyanodiamide comprising maintaining a catalyst at a temperature of 300 to 400° C. as a fluidized bed in a reaction zone by means of a current of ammonia, injecting dicyanodiamide with part of said ammonia current serving as carrier gas laterally at a high rate of speed into said reaction zone, thereby producing a homogeneous dispersion of said dicyanodiamide, said dicyanodiamide having a smaller particle size than the catalyst, passing the gas from the reaction zone through a precipitation zone to recover therein sublimed melamine, and maintaining said precipitation zone at a temperature above 150° C. but not higher than 230° C.

2. The method as claimed in claim 1 wherein the catalyst particles are at least three times as large as the dicyanodiamide particles and wherein at least fifty percent of the dicyanodiamide particles are at most $\frac{1}{10}$ as large as the catalyst particles.

3. The method as claimed in claim 1 comprising injecting the dicyanodiamide laterally into the reaction zone in vertical or slightly inclined direction.

4. The method as claimed in claim 1 comprising using less than ten percent by weight of the total ammonia as said carrier gas for the dicyanodiamide and injecting the mixture of said carrier gas and dicyanodiamide into the reaction zone at a speed at least 5 times the speed of the gas in the fluidized bed, the weight ratio of ammonia to dicyanodiamide in said mixture being at least 1:5.

5. The method as claimed in claim 4 wherein the temperature of said carrier gas is maintained below the melting point of the dicyanodiamide.

6. The method as claimed in claim 1 wherein the ammonia gas maintaining the fluidized catalyst bed in turbulent motion is preheated.

7. The method as claimed in claim 1 wherein the temperature of the reaction zone is 320–360° C.

8. The method as claimed in claim 1 wherein the reaction is carried out under elevated pressure up to about 20 atmospheres.

References Cited

UNITED STATES PATENTS 3,254,081   5/1966   Salgado et al. _____ 260—249.7

WALTER A. MODANCE, *Primary Examiner.*

JOHN M. FORD, *Assistant Examiner.*